Aug. 12, 1941.    F. E. HAND    2,252,372
RUNNER OPENER
Filed June 26, 1940
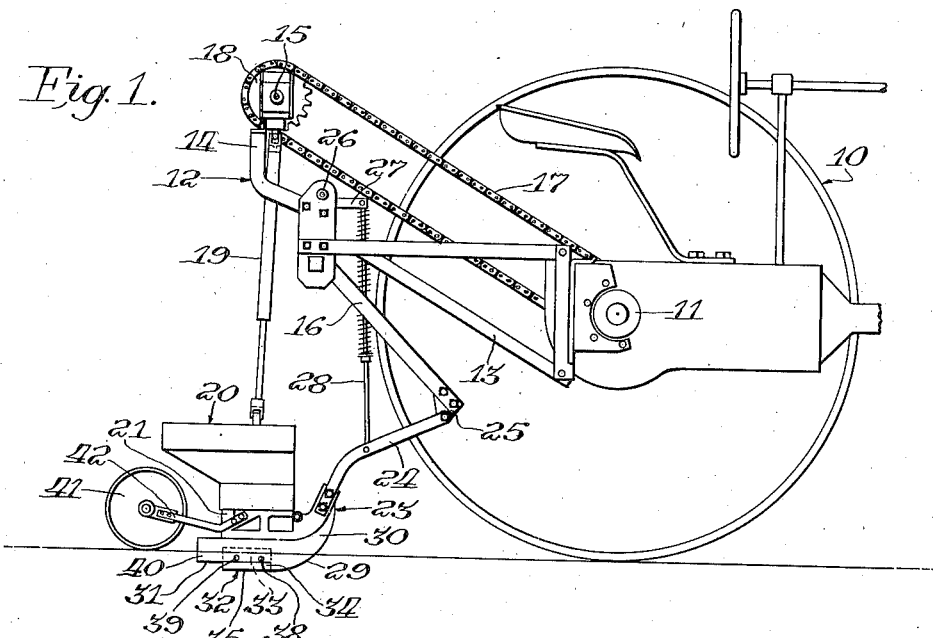
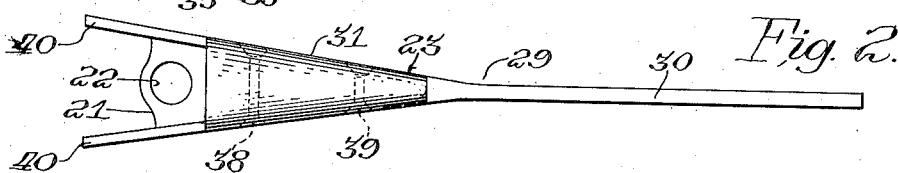
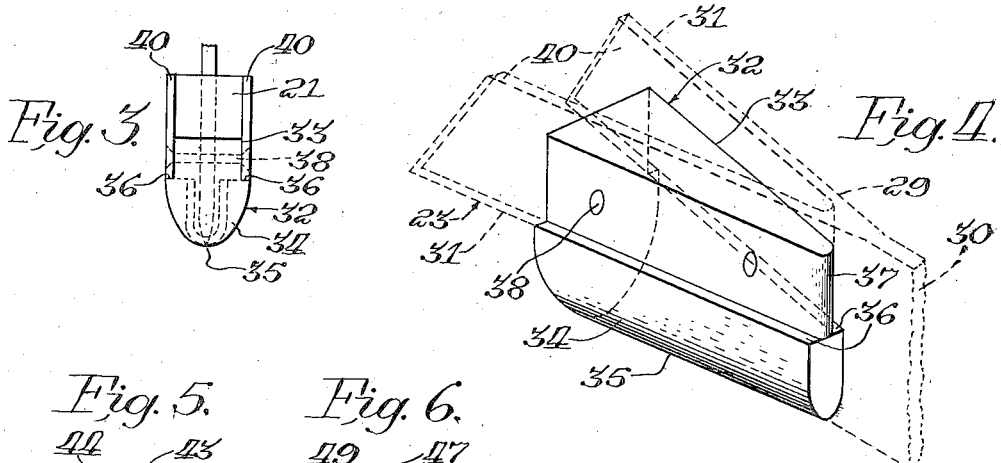
Inventor
Frederick E. Hand
By Paul O. Pippel
Atty.

Patented Aug. 12, 1941

2,252,372

UNITED STATES PATENT OFFICE 2,252,372

RUNNER OPENER

Frederick E. Hand, Canton, Ill., assignor to International Harvester Company, a corporation of New Jersey Application June 26, 1940, Serial No. 342,416

4 Claims. (Cl. 111—86)

This invention relates to a runner opener for a planter.

The typical runner opener for a planter comprises a body which is narrow and curved upwardly at the front and provided with wings at the rear and an intermediate lower portion of knife-like shape. With such an opener a furrow is formed by the curved front and the knife-like lower portions, and seed is dropped into the furrow between the wings at the rear. The disadvantage with this type of runner is that because of the knife-like lower portions a slit may be formed at the center of the furrow which serves as an air pocket and prevents the proper germination of the seed.

An object of the present invention is to provide an improved runner opener for a planter.

A further object is the provision of a runner opener so shaped as to form a furrow which will allow the seed better chance for germination.

According to the present invention the furrow opener includes the usual upwardly curved narrow front portion and wings at the rear and also an intermediate portion having a generally rounded shape at the bottom so that the bottom of the furrow is rounded, and air pockets are not permitted to be present around the seed, which might hinder germination.

In the drawing:

Figure 1 is a side view showing a tractor and a planting attachment connected thereto and including the novel furrow opener or runner of the present invention;

Figure 2 is a bottom view of the novel runner opener;

Figure 3 is a rear view thereof;

Figure 4 is a view of the furrow opener with the novel element in full lines;

Figure 5 shows a furrow made by the conventional furrow opener; and,

Figure 6 shows a furrow made by the furrow opener of the present invention.

Figure 1 shows a tractor 10 which includes a rear axle 11. A planting attachment 12 is connected to the rear axle 11 in the manner disclosed and claimed in the co-pending application of Graham et al., Serial Number 248,860, filed December 31, 1938. Briefly, this attachment comprises a frame structure 13 secured to the axle 11, a bracket 14 supporting a transversely extending shaft 15, and a bracket 16 serving as a support for the furrow runner presently to be described. Driving of the planting attachment is effected by means of a sprocket chain 17 driven by a sprocket, not shown, attached to the axle 11 and in turn driving a sprocket 18 secured to the drive shaft 15. A telescoping power take-off shaft 19 extends downwardly from the connection with the drive shaft 15 into a connection with a planter 20. The planter is driven by the shaft 19 in the manner disclosed in detail in the patent to Benjamin et al., 1,899,931, March 7, 1933. This planter includes a seed dropping tube, not shown, passing through a portion 21 and having an outlet 22 (see Figure 2) into a furrow runner 23. The planter including the furrow runner is carried by a link 24 pivoted at 25 on the bracket 16. Raising of the planter is effected by means of a rock-shaft 26 through the medium of an arm 27 and a link 28 connecting the arm 27 and the link 24.

The novel runner 23 of the present invention includes as one part a member 29 of Y-shape having a leg 30 and branches 31. This member is shown in full lines in Figure 2 and dotted lines in Figure 4, and it will be seen from these figures that the leg 30 of the member 29 is of greater width measured at the right angles to the plane of the Y than the branches 31. The other member of the furrow runner 23 is an insert member 32 of generally triangular shape increasing in width from the front to the back. This member comprises an upper portion 33 which is at every section taken transversely to the length of the insert member of lesser width than a lower portion 34. The under side of the lower portion 34 is of generally rounded shape as indicated at 35. As seen in Figure 4, the insert fits between the branches 31 of the member 29 of Y-shape, the sides of the branches 31 contacting shoulders 36 forming the juncture between the portions 33 and 34 of the insert member. The front end of the upper portion 33 of the insert member is rounded as at 37 so as to fit within the branches 31 at their juncture. The front end of the portion 34 is flat and abuts the part of the leg 30 which extends beyond the branches 31. The insert member 32 is held within the branches 31 of the member 29 by means of rivets indicated at 38 and 39. The ends of the branches 31 extend beyond the insert member 32 to form guides or wings 40 which act in conjunction with a tube passing down through the portion 21 of the planter to guide seed into the furrow formed by the furrow runner 23. The planter 20 also includes a covering wheel 41 connected with the rest of the planter by means of a member 42.

Figure 5 illustrates a furrow 43 formed by a conventional type planter. This furrow has a main portion 44 of generally uniform width throughout its depth and a narrow V-groove portion 45 formed by the knife-like edge of the conventional furrow runner. Seeds 46 are indicated in the base of the portion 44 of the furrow, and it will be seen that they have not gone down into the V-shaped portion 45 so as to fill it up. Thus, even after the furrow has been covered over by a furrow wheel, such as a wheel 41, the V-shaped portion 45 of the furrow is left unfilled and forms an air pocket which has been found to hinder proper germination of the seed.

Figure 6 shows a furrow 47 having a rounded bottom 48 formed by the rounded portion 35 of the insert member 32, of the improved furrow runner 23. Seeds 49 rest in the bottom of the furrow 47, and, when the furrow has been covered by the furrow wheel 41, there is no air pocket at the bottom of the furrow, the seeds resting there.

It will be apparent from the foregoing description that a new and novel furrow runner has been provided. This furrow runner is provided with a rounded bottom or heel which replaces the usual knife-like portion in the conventional furrow opener. With this novel furrow runner, a furrow of thoroughly pressed soil and of a substantial width at its base may be formed. Thus, seed may be placed in the furrow without the presence of an air pocket below them which might hinder germination. The construction of the furrow runner is novel apart from the shape in that it involves an insert member 33 which can stand considerable wear. However, if it becomes too worn for use after a long period of use, it may be readily replaced.

The intention is to limit the invention only within the spirit and scope of the appended claims.

What is claimed is:

1. A runner comprising a first member of Y-shape having the leg of the Y curved for facilitating entry into the ground, and a second member of a width increasing from one end to the other secured between the branches of the Y and having a bottom of generally rounded contour on sections transverse of a line between the ends of the second member, the ends of the branches of the member of Y-shape extending beyond the second member so as to constitute means for guiding seed into a furrow formed by the runner.

2. A runner comprising a first member of Y-shape, the leg of the Y being of greater width than the branches measured in a direction at right angles to the plane of the Y, a second member increasing in width from one end to the other and being of rounded shape on one side on sections transverse of a line between the ends and having a portion adjacent the other side and spaced from the said one side of rounded shape of less width at each section transverse to a line between the ends of the second member than the portion adjacent the said one side of rounded shape, the portion of less width being embraced by the branches of the Y of the first member and the portion of greater width abutting the leg of the Y at one end and extending beyond the sides of the branches of the Y which are parallel to the plane of the Y, the ends of the branches of the Y of the first member extending beyond the second member so as to constitute guides for guiding seed into a furrow formed by the runner.

3. A runner comprising a first member of Y-shape, a second member increasing in width from one end to the other and being of rounded shape on one side on sections transverse of a line between the ends and having a portion adjacent the other side and spaced from the said one side of rounded shape of less width at each section transverse to a line between the ends of the second member than the portion adjacent the said one side of rounded shape and also having a shoulder joining the portions, the portion of less width being embraced by the branches of the Y of the first member, the shoulder abutting the sides of the branches of the Y which are parallel to the plane of the Y, and the ends of the branches of the Y of the first member extending beyond the second member so as to constitute guides for guiding seed into a furrow formed by the runner.

4. A runner comprising a Y-shaped element and a member carried by the element and having one portion tapered to fit between the branches of the Y and another portion of said member adapted for ground engagement having its outer surfaces respectively flush with the outer surfaces of the branches of the Y, said outer surfaces and the opposite surfaces of the tapered portion forming opposite shoulders respectively abutting the edges of the branches of the Y.

FREDERICK E. HAND.